United States Patent [19]

Takahashi

[11] Patent Number: 5,589,140
[45] Date of Patent: Dec. 31, 1996

[54] CONTINUOUS DENITRATION APPARATUS

[75] Inventor: Yoshiharu Takahashi, Katsuta, Japan

[73] Assignee: Doryokuro Kakunenryo Kaihatsu Jigyodan, Tokyo, Japan

[21] Appl. No.: 583,934

[22] Filed: Jan. 11, 1996

Related U.S. Application Data

[63] Continuation of Ser. No. 121,422, Sep. 16, 1993, abandoned.

[30] Foreign Application Priority Data

Sep. 16, 1992 [JP] Japan .................... 4-246708

[51] Int. Cl.$^6$ .................................................. G21G 5/00
[52] U.S. Cl. .................... 422/159; 422/186; 422/233; 422/903; 219/679; 219/691; 219/701; 219/738; 204/157.43; 204/157.51
[58] Field of Search .................................... 422/159, 186, 422/186.04, 193, 199, 233, 308, 903; 219/679, 699, 700, 701, 736, 738, 691; 204/157.43, 157.51; 423/260; 970/DIG. 96

[56] References Cited

U.S. PATENT DOCUMENTS

| | | | |
|---|---|---|---|
| 3,263,052 | 7/1966 | Jeppson et al. | 219/691 |
| 4,406,937 | 9/1983 | Soulier | 219/699 |
| 4,444,723 | 4/1984 | Matsumaru et al. | 422/159 |
| 4,563,335 | 1/1986 | Akiyama et al. | 422/159 |
| 4,565,670 | 1/1986 | Miyazaki et al. | 422/186.04 |
| 4,844,838 | 7/1989 | Ohtsuka et al. | 423/183 |
| 4,877,938 | 10/1989 | Rav et al. | 219/700 X |
| 5,278,379 | 1/1994 | Takanashi | 422/159 X |

FOREIGN PATENT DOCUMENTS

| | | |
|---|---|---|
| 0036362 | 9/1981 | European Pat. Off. |
| 2526573 | 5/1983 | France . |
| 3346253 | 6/1984 | Germany . |
| 2019178 | 10/1979 | United Kingdom . |
| 2110803 | 6/1983 | United Kingdom . |

Primary Examiner—Robert J. Warden
Assistant Examiner—Hien Tran
Attorney, Agent, or Firm—Fish & Richardson P.C.

[57] ABSTRACT

A continuous denitration apparatus capable of ensuring mass processing of a nitrate solution of a nuclear fuel and a continuous stable operation. By a rotation of screws, uranium nitrate solution supplied from a liquid feed inlet is continuously conveyed. A trough is divided into a concentration zone, a denitration zone and a drying zone. Microwaves emitted from a microwave incident inlet pass through a microwave permeable part provided in a critical shield plate for covering the upper part of the trough and are applied to the uranium nitrate solution of high concentration and high viscosity, conveyed by the screws. The uranium nitrate solution is denitrated to prepare a denitrated product (uranium trioxide). This denitrated product is dried in the drying zone to obtain powder to be discharged from an outlet. The deposition adhering to the screws in the concentration zone can be exfoliated by moving the microwave permeable part a little to the concentration zone side to prevent a blocking of the rotation of the screws. In the drying zone, local heating by the microwaves can be prevented.

6 Claims, 4 Drawing Sheets

CONTINUOUS DENITRATION APPARATUS

This application is a continuation of U.S. application Ser. No. 08/121,422, filed Sep. 16, 1993, now abandoned.

BACKGROUND OF THE INVENTION i) Field of the Invention

The present invention relates to the reprocessing of nuclear fuel, and more particularly to a continuous denitration apparatus for continuously extracting an oxide of nuclear fuel from a nitric acid solution thereof.

ii) Description of the Related Arts

In general, uranium nitrate and plutonium nitrate recovered in the reprocessing of nuclear fuel and a mixture of these substances are denitrated to convert into raw material powder by using a microwave heating direct denitration method. Two methods of reprocessing nuclear fuel using microwave heating are known: a batch processing method and a continuous processing method. In the batch method, a certain amount of solution of uranium nitrate or the like is poured into a container such as a so-called denitration bowl or tray and an evaporation-concentration, a denitration and a dying of the solution are executed in a microwave electric field. In the continuous method, the solution is successively processed in an evaporation-concentration zone, a denitration zone and a drying zone. In order to realize the latter method, a screw continuous denitration apparatus is developed, wherein a solution to be processed is conveyed in succession by a rotation of a screw so as to carry out a series of processes in the above-described zones.

In this apparatus, as a notable difference from the batch processing, by continuously performing the evaporation-concentration, the denitration and the drying steps on a time base, mass processing can be carried out However, in order to stably execute this processing, the above-described steps must be controlled under certain conditions such as predetermined ranges of temperature, concentration and the like.

FIG. 3 illustrates a conventional continuous denitration apparatus. In FIG. 3, (A) is an elevational view, (B) is a side view and (C) is a top plan view. As shown in FIG. 3, a pair of long screws 12-1 and 12-2 are contained within a trough 11 having a long box form and are rotated in the directions by a drive motor (not shown), as shown by arrows in FIG. 3 (B). This trough 11 is isolated from a space formed by an upper oven 15 by a partition plate 13 composed of quartz glass, and the trough 11 is provided with a liquid feed inlet 14 for feeding a nitrate solution such as uranium nitrate of the nuclear fuel into the trough 11, an outlet 16 for discharging a nuclear fuel oxide produced as a result of a denitration processing, and a gas outlet 22 for discharging gases or the like produced within the trough 11.

The oven 15 is provided with four microwave incident inlets 21-1 to 21-4 on its top and a microwave with a predetermined frequency is incident to the oven 15 from the microwave incident inlets 21-1 to 21-4. In this apparatus, he space formed by the oven 15 is divided into three areas by microwave reflection boxes 18 and 19. That is, the first area is a concentration zone, in which the uranium nitrate solution is heated and concentrated by the microwave incident from the microwave incident inlet 21-1. The second area is a denitration zone where the uranium nitrate solution concentrated to a supersaturated condition in the concentration zone is denitrated by the microwave entered from the microwave incident inlet 21-2 to produce an oxide (for example, uranium trioxide) of the nuclear fuel. The third area is a drying zone, in which the oxide produced in the denitration zone is dried by the microwave irradiated through the microwave incident inlets 21-3 and 21-4 to obtain powder to be discharged from the outlet 16.

The trough 11 as a whole is installed at a minute inclination angle with respect to the horizontal level, and the uranium nitrate solution supplied from the liquid feed inlet 14 forms a liquid fraction part 24 extending to approximately the middle part of the denitration zone, as shown by an inclined line in FIG. 3 (A).

FIG. 4 conceptually shows the contents of the processing in such a screw continuous denitration apparatus. In FIG. 4, the horizontal axis represents the position in the screw rotation shaft direction and the vertical axis represents the temperature of the object to be processed in each position. As shown in FIG. 4, in the concentration zone, the uranium nitrate solution is heated to a boiling state and is sent to the denitration zone via the reaction process shown in the following formulas (1) to (4).

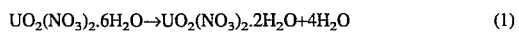
$$UO_2(NO_3)_2 \cdot 6H_2O \rightarrow UO_2(NO_3)_2 \cdot 2H_2O + 4H_2O \quad (1)$$

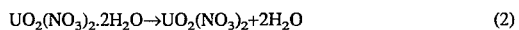
$$UO_2(NO_3)_2 \cdot 2H_2O \rightarrow UO_2(NO_3)_2 + 2H_2O \quad (2)$$

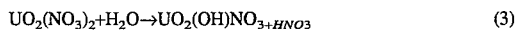
$$UO_2(NO_3)_2 + H_2O \rightarrow UO_2(OH)NO_3 + HNO_3 \quad (3)$$

$$UO_2(OH)NO_3 \rightarrow \beta\text{-}UO_3 + \tfrac{1}{2}H_2O + NO_2 + \tfrac{1}{4}O_2 \quad (4)$$

In the front end of the liquid fraction part 24 of the denitration zone, the uranium nitrate solution is in a supersaturated condition with an extremely high viscosity, and, while adhering to the lower part of the trough 11 and the blades of the screws 12-1 and 12-2 in the denitration zone, the high viscosity substance is denitrated to produce a denitrated product.

As described above, in order to quickly cause the denitration reaction, it is necessary to heat the solution to be processed to concentrate the solution to the supersaturated condition to reach a metal production concentration of the denitrated product such as $UO_3$. However, in the aforementioned conventional denitration apparatus, due to wrap-around effect of the microwave from the microwave incident inlets 21-1 and 21-2, in a considerably wide range 26 including a part of the concentration zone, as shown in FIG. 3 (A), the solution to be processed reaches the supersaturated condition and thus the high viscosity substance can be produced in the entire concentration zone. Such a solution in the supersaturated condition can readily be solidified by a slight temperature drop. It can be considered that this condition is attributable to a formation of $\gamma\text{-}UO_3$ in place of $\beta\text{-}UO_3$ in formula (4), and the deposited uranium having a sherbet form sticks to not only the blades of the screws but also the screw shafts, as shown in FIG. 5, and gradually grows. It is hard to exfoliate the stuck uranium from the screws and the stuck uranium can sometimes stop the rotation of the screws to render operation impossible.

In order to prevent such a supersaturated condition of the whole concentration part, it can be considered further heat the concentration part for keeping it highly soluble condition. Hence, it is sufficient to successively control the output of the microwave. However, in general, such a control is troublesome, and, when the output of the microwave is raised to excess, electric discharge tends to be caused in the oven or in corner parts of the microwave reflection boxes. Also, by carrying out such a control, electric field strength distribution in each zone becomes unstable. In particular, sufficient electric power required for the denitration zone is not supplied and the preparation of the denitrated product can not be stably performed. Further, when the electric field strength distribution becomes unstable, the denitrated product ($UO_3$) sent to the drying zone is partially heated by applying the microwave to produce triuranium octoxide or uranyl uranate ($U_3O_8$) and the triuranium octoxide ($U_3O_8$) further absorbs the microwaves to grow, thereby obtaining an uneven mixture product (oxides of the nuclear fuel) containing $UO_3$ and $U_3O_8$.

On the other hand, another method is known, wherein, when the concentration of the whole concentration zone is raised to start the supersaturated condition forming, nitric acid is supplied from the liquid feed inlet 14 in order to dilute the solution. However, in this method, a drop of a processing amount is liable and it is difficult to produce a uniform product. Hence, this method is not advantageous.

As described above, in the conventional continuous denitration apparatus, in the evaporation-concentration process, the uranium in the solution reaches the supersaturated condition and is deposited to stop the rotation of the screws, and in the drying process, the produced uranium trioxide absorbs the microwaves to produce the triuranium octoxide. As a result, the uniform product (uranium trioxide) can not be obtained.

SUMMARY OF THE INVENTION

Accordingly, it is an object of the present invention to provide a continuous denitration apparatus in view of the aforementioned problems of the prior art, which is capable of ensuring mass processing of a nitrate solution of nuclear fuel and a continuous stable operation.

In accordance with one aspect of the present invention, there is provided a continuous denitration apparatus for continuously denitrifying a nitrate solution of a nuclear fuel substance contained in a long nitrate solution processing area which is divided into a concentration zone for evaporating and concentrating the nitrate solution by heating, a denitration zone for denitrifying the nitrate solution concentrated in the concentration zone to prepare a denitrated product, and a drying zone for drying the denitrated product prepared in the denitration zone, comprising screw means extended along the nitrate solution processing area for continuously conveying the nitrate solution in a direction of an extension of the screw means by rotating the screw means around a long rotation axis thereof; microwave applying means for applying a microwave to the nitrate solution conveyed by the screw means; and a critical shield plate with a microwave non-permeability, the critical shield plate having a microwave permeable part in a boundary part between the screw means and the microwave applying means, the microwaves being applied to the nitrate solution conveyed by the screw means via only the microwave permeable part of the critical shield plate.

In this apparatus, by forming the microwave permeable part in a part of the critical shield plate for shielding the microwaves, the microwave energy can be supplied to only the restricted range.

Another feature of the present invention is to provide the microwave permeable part near the concentration zone.

In this apparatus, by providing the microwave permeable part near the denitration zone, the microwave energy can be preferentially supplied to the primary denitration zone. As a result, the negative influence of the microwaves to the concentration zone and the drying zone can be sufficiently restricted.

A further feature of the present invention is to cover the microwave permeable part by material which is permeable to microwaves.

In this apparatus, by covering the microwave permeable part with the material which is permeable by microwaves, a critical dimension can be ensured and the inside of the oven can be kept clean.

Another feature of the present invention is to make an opening dimension of the microwave permeable part variable.

Another feature of the present invention is to make an opening position of the microwave permeable part variable and to make the microwave permeable part movable to the concentration zone and the drying zone.

Another feature of the present invention is to make both an opening dimension and an opening position of the microwave permeable part variable.

In this apparatus, by varying the position and the dimension of the microwave permeable part during the operation, the supply position of the microwave energy can be moved or the microwave energy supplied to the denitration zone can be adjusted.

Another feature of the present invention is to provide another microwave permeable part having a slit form in at least one of the concentration zone or the drying zone.

In this apparatus, by providing another microwave permeable part of the slit form in the concentration zone or the drying zone, the heating for the concentration or the drying of the solution can be carried out by using the microwaves passing through another microwave permeable part.

Another feature of the present invention is to provide an external heater in at least one of the concentration zone and the drying zone.

In this apparatus, the heating for the concentration or the drying is executed by the external heater.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENT

Figure 1A:
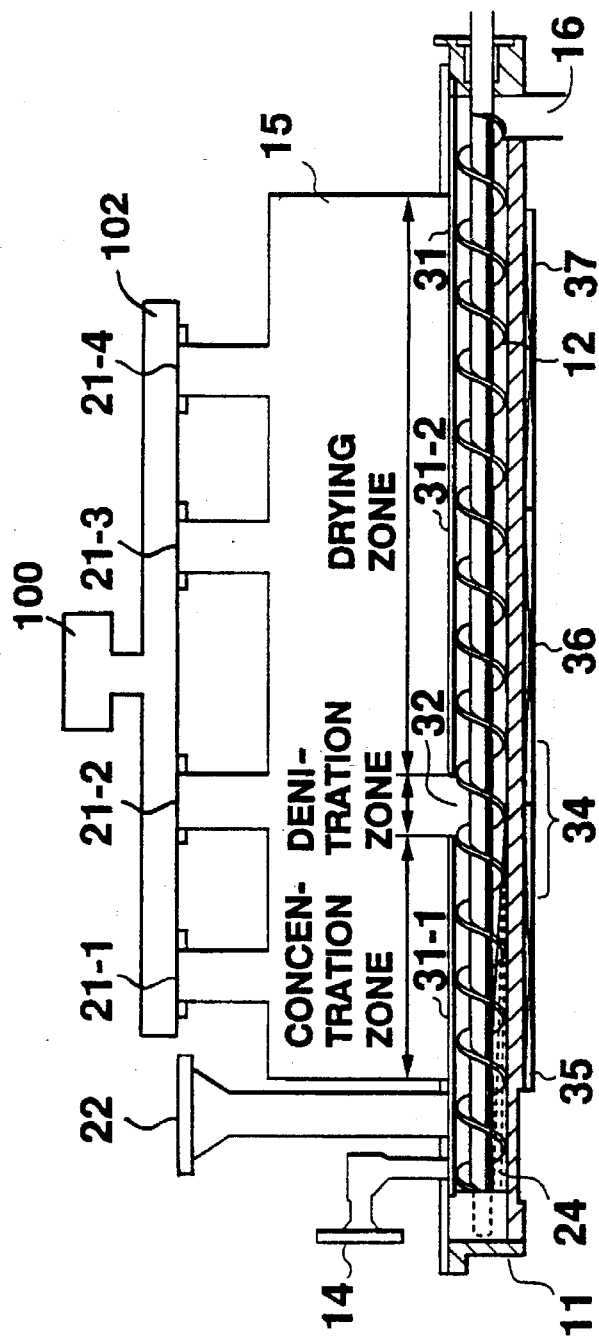
FIG. 1 is a prospective view of one embodiment of a continuous denitration apparatus according to the present invention.

The present invention will now be described in connection with its preferred embodiment with reference to the accompanying drawings, wherein the same parts as those described above in connection with the conventional embodiment are designated by the same reference characters and thus the repeated description thereof can be omitted for brevity.

Figure 1B:
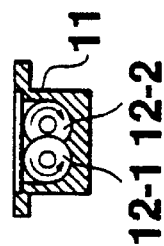
Figure 1C:
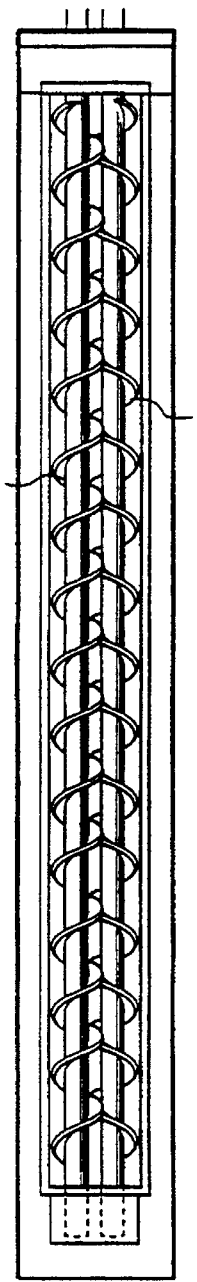

In FIG. 1, there is shown one embodiment of a continuous denitration apparatus according to the present invention, wherein (A) is an elevational view, (B) is a side view and (C) is a top plan view.

As shown in FIG. 1, within a trough 11 having a long box form, a pair of long screws 12-1 and 12-2 are contained in the same manner as the conventional manner and the two screws 12-1 and 12-2 are rotated by a drive motor (not shown) in directions shown by arrows in FIG. 1 (B).

In this embodiment, the trough 11 is isolated from a space formed by an upper oven 15 by a critical shield plate 31 (for example, composed of a stainless steel) with a microwave non-permeability and acid corrosion resistance properties and the critical shield plate 31 is provided with a movable microwave permeable part 32 having a variable opening dimension for passing the microwaves. The critical shield plate 31 includes first and second movable plates 31-1 and 31-2. The moving of the microwave permeable part 32 of the critical shield plate 31 can be performed by sliding the first and second movable plates 31-1 and 31-2 an equal amount in the same direction by a moving mechanism (not shown), and the opening dimension variation of the microwave permeable part 32 can be executed by moving one of the first and second movable plates 31-1 and 31-2 or moving both the first and second movable plates 31-1 and 31-2 by different amounts. Actually in this embodiment, it is necessary to cover the microwave permeable part 32 of the critical shield plate 31 by using a quartz glass plate for ensuring a critical dimension, as shown in FIG. 1. In this case, the critical dimension means a nuclear fuel container dimension required so as not to continuously start a nuclear fission chain reaction.

Also, the trough 11 is provided with a liquid feed inlet 14 for feeding a nitrate solution such as uranium nitrate of the nuclear fuel into the trough 11, an outlet 16 for discharging a nuclear fuel oxide (uranium trioxide $UO_3$) produced as a result of denitration processing, and a gas outlet 22 for discharging gases or the like produced within the trough 11.

The oven 15 is provided with four microwave incident inlets 21-1 to 21-4 on its top. A microwave generator is attached to a wave guide 102 which conveys microwaves with a predetermined frequency to the oven 15 via the microwave incident inlets 21-1 to 21-4. In this embodiment, no microwave reflection box of the conventional apparatus is provided, and the space formed by the oven 15 is not divided. In this case, although the four microwave incident inlets are provided in the same manner as the conventional apparatus, the number of the microwave incident inlets can be designed to one or any other number except the one. Also, it is not necessary for the space of the oven to be so large, as shown in FIG. 1, and it can be compacted so that an electric field density of the microwaves need not be any larger than necessary.

In this embodiment, the trough 11 is divided into three areas or zones along the direction of the rotational shafts of the screws 12-1 and 12-2. The first area is a concentration zone where the uranium nitrate solution is heated and concentrated mainly by a trough heater 35. The second area is a denitration zone positioned directly under the microwave incident inlet 21-2 and the microwave permeable part 32 is provided on the upper part of this zone. In this zone, the uranium nitrate solution concentrated to a supersaturated condition in the concentration zone is heated by the microwaves applied from the microwave permeable part 32 to carry out the denitration to produce the nuclear fuel oxide ($UO_3$). The third area is a drying zone, in which the oxide produced in the denitrification zone is heated by trough heaters 36 and 37 to dry the same to produce a powdery substance which is discharged from the outlet 16.

The trough 11 on the whole is installed at a minute inclination angle (for example, approximately 1°) with respect to the horizontal level and the uranium nitrate solution supplied from the liquid feed inlet 14 forms a liquid fraction part 24 extending to approximately the middle part of the denitration zone, as shown by an inclined line in FIG. 1 (A).

Next, the continuous denitration process by the above-described continuous denitration apparatus of the present invention will now be described in connection with FIG. 2.

Figure 2:
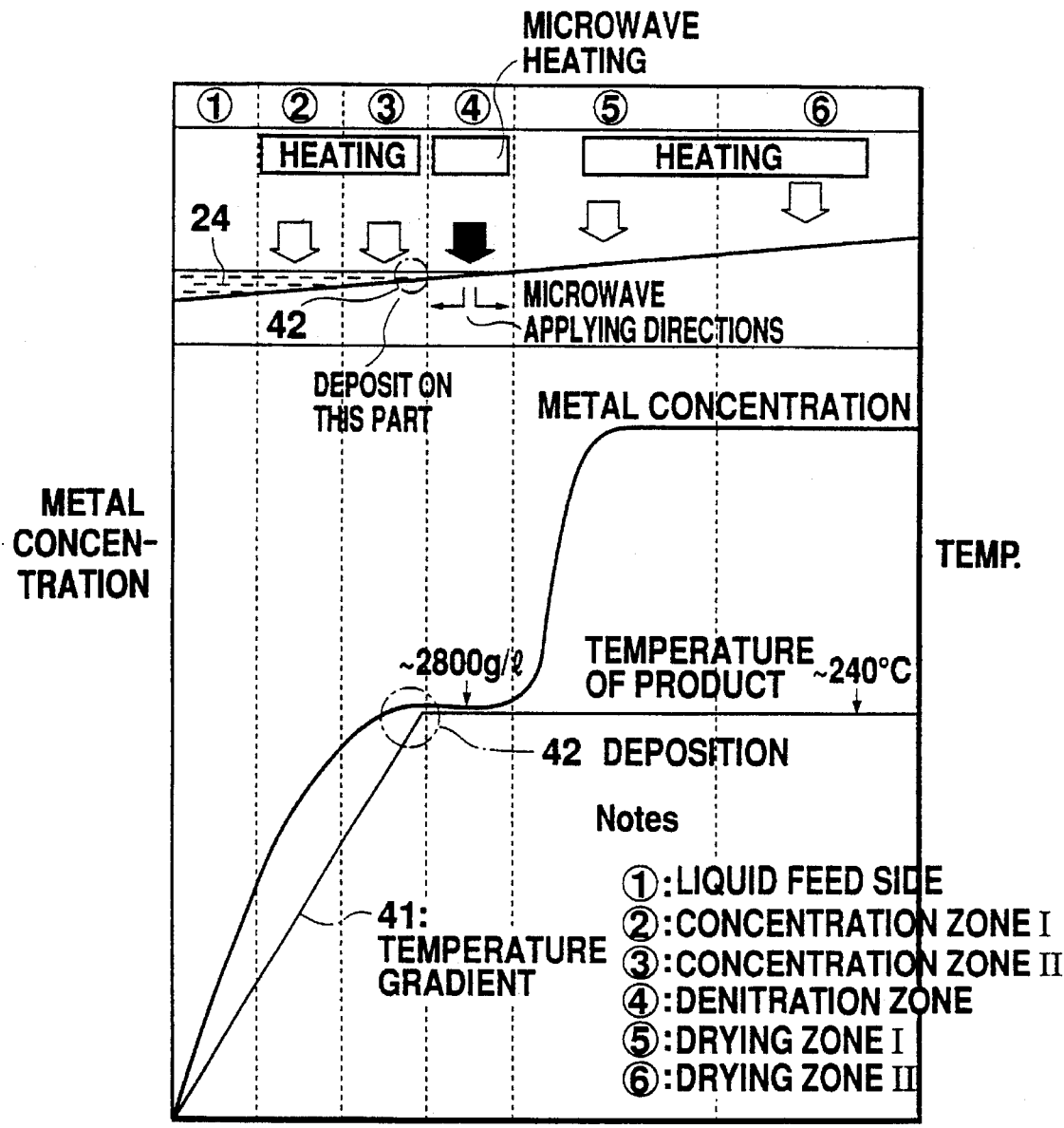
FIG. 2 is a schematic graphical view showing contents of a continuous denitration processing in the apparatus shown in FIG. 1.
Figure 3A:
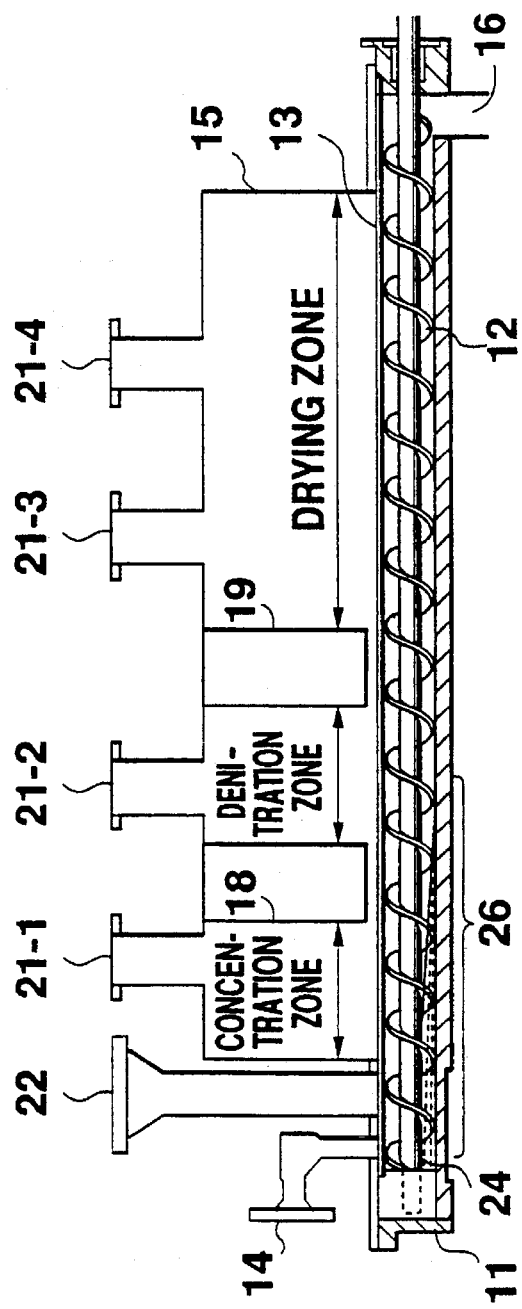
FIG. 3 is a projective view of a conventional continuous denitration apparatus.
Figure 3B:
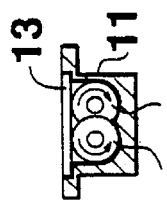
Figure 3C:
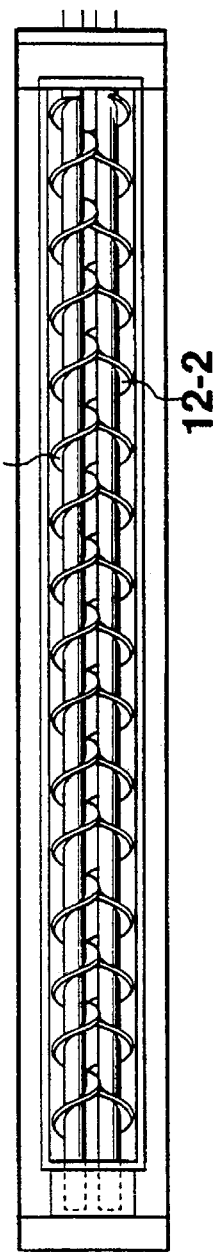
Figure 4:
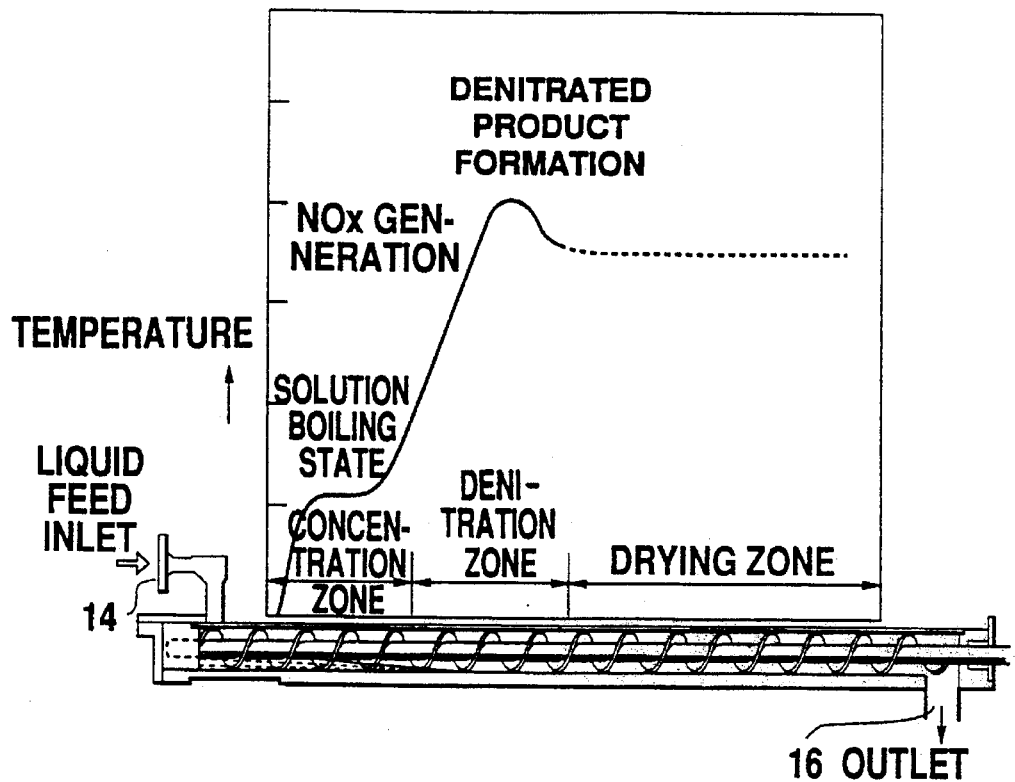
FIG. 4 is a schematic graphical view showing processing contents of a conventional general screw continuous denitration apparatus.

The trough heater 35 is controlled so that the concentration zone as a whole may be a concentration slope 41 indicated in FIG. 2. The uranium nitrate solution supplied from the liquid feed inlet 14 reaches a boiling condition due to the heating by means of the trough heater 35 in the concentration zone, is evaporated and concentrated by the reaction process represented by the above-described formulas (1) to (3), and is then sent to the next denitration zone.

In the denitration zone, the concentrated uranium nitrate solution is rapidly and normally denitrated by the microwave energy sufficiently supplied via the microwave permeable part 32 according to the above-described formula (4) and the produced denitrated product is sent to the drying zone. In this case, the produced denitrated product is the normal uranium trioxide ($\beta$-$UO_3$) which is the desirable substance as the intrinsic product.

Figure 5:
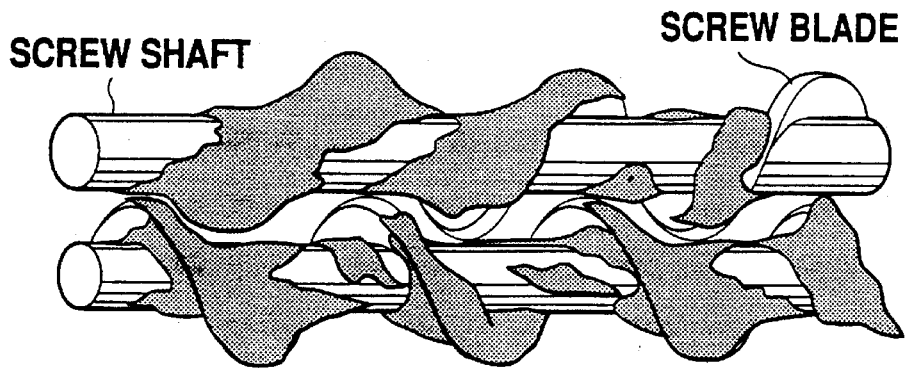
FIG. 5 is a fragmentary perspective view of screws of a conventional continuous denitration apparatus for illustrating a deposited product adhered to the screws.

In the concentration zone, as the uranium nitrate solution is concentrated, the uranium nitrate solution attains a supersaturated condition of high viscosity and a deposited substance of a sherbet form adheres to the blades of the screws and gradually grows to block the rotation of the screws in an area 42 shown in FIG. 2. This deposition is mainly $\gamma$-$UO_3$ produced as a result of the fact that the normal (sufficient) denitration is not performed. On the other hand, the microwaves passing through the microwave permeable part 32 circulate to a range 34 shown in FIG. 1 (A) and limitatively supplies the microwave energy with the high electric field strength to the area 42 shown in FIG. 2. By this high density energy, the sherbet form of the uranium which is stuck to the blades of the screws can be quickly and normally denitrated and is exfoliated from the blades of the screws. In this case, different from the conventional embodiment shown in FIG. 5, the uranium hardly adheres to the screw shafts.

Further, in this condition, by moving the microwave permeable part 32 a minute amount to the concentration zone side, the sherbet form of the deposition adhering to the screw blades can be further quickly and normally denitrated and be effectively exfoliated. As the minute amount, approximately 10 to 15 mm is sufficient.

In the drying zone, as shown in FIG. 2, the uranium trioxide as the denitrated product is kept to a temperature of approximately 240° C., is dried to the metal concentration and is powdered. In this drying zone, since the influence due to the wraparound of the microwaves from the microwave permeable part 32 is attainable only to the extremely restricted range, the change of the uranium trioxide ($UO_3$) to the triuranium octoxide ($U_3O_8$) by the local heating can be effectively prevented and thus the stable product can be obtained.

In this embodiment, the control is carried out, that is, for example, the frequency of the microwaves=2450 MHz, the output of the microwaves=2 to 3.5 KW, the temperature of the trough heater 35 in the concentration zone=150° C., and the temperature of the trough heaters 36 and 37 in the drying zone=350° C. A microwave wave guide having an internal cross dimension of 110×54.6 mm has been used. Also, the dimension of the microwave permeable part 32 is determined to be 100×60 to 100×100 mm, and it has been confirmed that approximately 100×75 mm is the most effective.

Further, in this embodiment, although the heating of the concentration zone and the drying zone is executed by the trough heaters, in place of the trough heaters, the critical shield plate 31 covering these zones can be provided with openings of a slit form so as to control the microwave and the microwave energy can be supplied from these openings for the heating.

As described above, according to the present invention, by providing a microwave permeable part in a part of a critical shield plate for shielding the microwaves, the microwaves energy can be preferentially supplied to the primary denitration zone, and thus the influence of the microwave to the concentration zone and the drying zone can be sufficiently restricted. Hence, the stopping of the rotation of the screws due to the sticking of the high viscosity deposition thereto in the concentration zone can be prevented. Accordingly, the stable operation as the continuous denitration apparatus can be ensured and the local heating in the drying zone can be avoided to obtain the uniform product. Also, by varying the position and the dimension of the microwave permeable part during the operation, the exfoliation of the deposition which is stuck to the screws can be effectively carried out.

While the present invention has been described with reference to the particular illustrative embodiment, it is not to be restricted by those embodiment but only by the appended claims. It is to be appreciated that those skilled in the art can change or modify the embodiment without departing from the scope and spirit of the present invention.

What is claimed is:

1. A continuous denitration apparatus, operating on a nitrate solution, comprising:

a nitrate solution processing area which is divided into a concentration zone which uses heat to evaporate and concentrate nitrate solution, a denitration zone which denitrifies the nitrate solution concentrated in the concentration zone to prepare a denitrated product, and a drying zone for drying the denitrated product prepared in the denitration zone;

a screw element, extended along the nitrate solution processing area, and operating to convey the nitrate solution in a direction of its extended direction by rotating the screw element around a rotation axis thereof;

a microwave source; and a critical shield plate formed of a microwave non-permeable material covering an entire length of the nitrate solution processing area, the critical shield plate including a microwave permeable portion provided in said denitration zone, over less than the entire length of the nitrate solution processing area, whereby microwaves from the microwave source are applied to the material for processing only at the microwave permeable part of the critical shield plate.

2. An apparatus as in claim 1 wherein said critical shield plate is movable to form a variable opening dimension of said microwave permeable portion.

3. An apparatus as in claim 2 further comprising an opening part having a slit form, provided in at least one of the concentration zone or the drying zone, said slit form opening part operating to apply heat to said at least one of the concentration zone or the drying.

4. Apparatus as in claim 1 further comprising an external heater provided in one of said concentration zone and said drying zone.

5. A continuous denitration apparatus which operates to denitrify a nitrate solution comprising:

a nitrate solution processing area which is divided into a concentration zone which concentrates nitrate solution, a denitration zone which denitrifies the nitrate solution concentrated in the concentration zone to prepare a denitrated product, and a drying zone for drying the denitrated product prepared in the denitration zone;

a screw element extended along the nitrate solution processing area and operating to convey the nitrate solution in a direction of its extended direction;

a microwave source operating to produce microwave energy; and a critical shield plate formed of a non-microwave permeable material covering an entire length of the nitrate solution processing area, the critical shield plate including a microwave permeable portion, whereby microwave energy from the microwave source are applied to the material for processing only at the microwave permeable portion of the critical shield plate, wherein said microwave permeable portion defined by an opening area, said opening area being variable by movement of said critical shield plate, said opening area covering said denitration zone, and being variable to include a portion of the concentration zone and a portion area of the drying zone.

6. A continuous denitration apparatus comprising:

a nitrate solution processing area which is divided into a concentration zone which uses heat to evaporate and concentrate nitrate solution, a denitration zone which denitrifies the nitrate solution concentrated in the concentration zone to prepare a denitrated product, and a drying zone for drying the denitrated product prepared in the denitration zone;

a screw element extended along the nitrate solution processing area operating to convey the nitrate solution in a direction of its extended direction by rotating the screw element around a rotation axis thereof;

a microwave source; and a critical shield plate formed of a non-microwave permeable material covering an entire length of the nitrate solution processing area, the critical shield plate including a microwave permeable portion whereby microwaves from the microwave source are applied to the nitrate solution processing area at the microwave permeable portion of the critical shield plate, said critical shield plate being movable to vary a dimension of the microwave permeable portion, the microwave permeable portion being provided in said denitration zone.

\* \* \* \* \*